United States Patent
Kim et al.

(10) Patent No.: US 7,356,263 B2
(45) Date of Patent: Apr. 8, 2008

(54) SIGNAL PROCESSOR FOR CONVERTING SIGNAL

(75) Inventors: Dong Churl Kim, Daejeon (KR); Dae Su Yee, Daejeon (KR); Young Ahn Leem, Daejeon (KR); Eun Deok Sim, Daejeon (KR); Kyung Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 422 days.

(21) Appl. No.: 11/190,755

(22) Filed: Jul. 27, 2005

(65) Prior Publication Data

US 2005/0276614 A1 Dec. 15, 2005

(30) Foreign Application Priority Data

Dec. 6, 2004 (KR) .................... 10-2004-0101658

(51) Int. Cl.
*H04B 10/02* (2006.01)
(52) U.S. Cl. ..................... 398/176; 398/183
(58) Field of Classification Search ............. 398/175, 398/176, 180, 183, 185, 189, 190, 191
See application file for complete search history.

(56) References Cited

U.S. PATENT DOCUMENTS 6,448,913 B1 9/2002 Prucnal et al.
6,636,318 B2 * 10/2003 Sarathy et al. .............. 356/477
6,643,040 B2 * 11/2003 Shen et al. .................. 359/107
7,085,498 B2 * 8/2006 Lee et al. .................... 398/155

OTHER PUBLICATIONS

'Chirp Consequences of All-Optical RZ to NRZ Coversion Using Cross-Phase Modulation in an Active Semiconductor Photonic Integrated Circuit' Park et al., IEEE Photonics Technology Letters, vol. 12, No. 3, Mar. 2000, pp. 233-235.
'All-Optical Data Format Conversion Between RZ and NRZ Based on Mach-Zehnder Interferometric Wavelength Converter' Xu et al., IEEE Photonics Technology Letters, vol. 15, No. 2, Feb. 2003, pp. 308-310.
'40 Gbits/s all-optical wavelength converter and RZ-to-NRZ format adapter realized by monolithic integrated active Michelson interferometer' Mikkelsen et al., Electronic Letters, vol. 33, No. 2, Jan. 16, 1997, pp. 133-134.

* cited by examiner

*Primary Examiner*—Christina Leung
(74) *Attorney, Agent, or Firm*—Ladas & Parry LLP

(57) ABSTRACT

Provided is a signal processor for converting a signal that converts a return to zero (RZ) signal into a non-return to zero (NRZ) signal, in which two 2R (re-amplifying, re-shaping) regenerators are connected in parallel between an input waveguide and an output waveguide with different lengths from each other. The 2R regenerator includes: two semiconductor optical amplifiers having different lengths from each other; and phase control means connected to a short semiconductor optical amplifier. The RZ signal input by a length difference of the waveguide is delayed by a time difference of a half of one bit so that the 2R regenerated NRZ signal can be obtained.

11 Claims, 2 Drawing Sheets

SIGNAL PROCESSOR FOR CONVERTING SIGNAL

CROSS-REFERENCE TO RELATED APPLICATION

This application claims priority to and the benefit of Korean Patent Application No. 2004-101658, filed Dec. 6, 2004, the disclosure of which is incorporated herein by reference in its entirety.

BACKGROUND

1. Field of the Invention

The present invention relates to a signal processor for converting a signal, and more specifically, to a signal processor for converting a signal that performs 2R (re-amplifying, re-shaping) regeneration while converting a return to zero (RZ) signal into a non-return to zero (NRZ) signal.

2. Discussion of Related Art

In general, an optical signal for use in an optical communication system is classified into an RZ signal and an NRZ signal.

The NRZ signal is obtained by modulating a continuous wave (CW). Therefore, it is rather simply generated relative to the RZ signal and less sensitive to a timing jitter than the RZ signal. The bandwidth of an optical receiver for the NRZ signal may be smaller than a rate of the RZ signal. This is because electronic apparatuses should detect change of one bit signal from "1" to "0" for the RZ signal. However, when the NRZ signal is used in a wavelength division multiplexing, signals having different wavelengths are more often overlapped in time than RZ signal, which leads to a nonlinear disturbance.

Further, the RZ signal generally has good sensitivity at a receiving unit, so that it is less restricted by intensity of a signal. In addition, compared with the NRZ signal, the RZ signal is less overlapped in time, thus resulting in small nonlinear phenomena.

To increase a signal transmission rate in the recent communication system, the signal rate is increased up to more than 40 Gbit/s or a wavelength division multiplexing (such as DWDM) is used. However, in this case, there are various problems in that the signal intensity varies across an optical fiber, and that the system is affected a lot by dispersion characteristics, a transmission distance and nonlinear characteristics of the optical fiber. Therefore, all details should be considered, such as which system characteristics and type of signal format should be employed, which characteristics the employed signal should have.

In this respect, various methods are presented that converts the RZ signal into the NRZ signal.

B. Mikkelsen et al. disclose that an RZ signal of 40 Gbit/s is converted into an NRZ signal using a Michelson interferometer as a wavelength converter. When an optical signal having a short pulse width is incident on the Michelson interferometer, carriers of a semiconductor optical amplifier are reduced as light is amplified, while recovered as optical signals pass through the semiconductor optical amplifier. In other words, a wavelength-converted signal is obtained using interferometer characteristics depending on a refractive index variation of the semiconductor optical amplifier. However, for example, when a series of RZ signals of 10 GHz having a short pulse width is incident on the wavelength converter, as long as a special apparatus is not provided, this method will generate a phase recovery speed of the semiconductor optical amplifier slower than a pulse gap of a series of the RZ signals. Therefore, peaks of the incident RZ signals are flattened, and the resulting NRZ signals are obtained (B. Mikkelsen et al., "40 Gbit/s All-Optical Wavelength Converter and RZ to NRZ Format Adapter Realized By Monolithic Integrated Active Mikkelson Interferometer", Electronics Letters, Vo. 33, pp. 133-144, 1997).

Lei Xu et al. disclose that the incident RZ signals are passed through several delay lines to generate pulse trains having a narrow gap and these signals are injected into the wavelength converter and converted into the NRZ signal. The method has the same principle as that of B. Mikkelsen et al., but with this, the RZ signal is converted into the pulse trains having a narrower gap using several delay lines to obtain the format converted NRZ signals. However, there is a drawback in that the apparatus is complicated due to use of the delay lines and the wavelength converter (Lei Xu et al., "All-Optical Data Format Conversion Between RZ and NRZ Based a Mach-Zehnder Interferometric Wavelength Converter", IEEE Photonics Technology Letters, Vo. 15, pp. 308-310, 2003).

Sang-Gyu Park et al. present a method in which an input RZ signal is divided into two signals and time-delayed through delay lines, and then, incident on a Mach-Zehnder wavelength converter. With this method, a signal speed can be improved using a time delay, but there is a drawback in that a delay line should be used. In addition, essentially, the Mach-Zehnder wavelength converter does not have a step-like optical transfer curve so that 2R regeneration capability is not good (Sang-Gyu Park et al., "Chirp Consequences Of All-Optical RZ to NRZ Conversion Using Cross-Phase Modulation In An Active Semiconductor Photonic Integrated Circuit", IEEE Photonics Technology Letters, Vol. 12, pp. 233-235, 2000).

SUMMARY OF THE INVENTION

The present invention is directed to a signal processor for converting a signal capable of converting an RZ signal into an NRZ signal having a high extinction ratio.

One aspect of the present invention is to provide a signal processor for converting a signal that converts a return to zero (RZ) signal into a non-return to zero (NRZ) signal, the signal processor including: first and second waveguides respectively connected to an output stage of an input waveguide and having different lengths from each other; first and second 2R regenerators respectively connected to the first and second waveguides; a third waveguide connected between an output stage of the first 2R regenerator and an output waveguide; a phase shifter connected to an output stage of the second 2R regenerator; and a fourth waveguide connected between the phase shifter and the output waveguide.

The first and third waveguides are be longer than the second and fourth waveguides, and a time delay is provided according to a time corresponding to a half of one bit of the RZ signal caused by a length difference between the first and third waveguides and the second and fourth waveguides.

The first 2R regenerator includes: first and second semiconductor optical amplifiers connected in parallel between the first and third waveguides and having different lengths from each other; and phase control means connected between the first semiconductor optical amplifier and the third waveguide, and the second 2R regenerator includes: first and second semiconductor optical amplifiers connected in parallel between the second and fourth waveguides and having different lengths from each other; and phase control means connected between the first semiconductor optical amplifier and the fourth waveguide.

The first semiconductor optical amplifier is shorter than the second semiconductor optical amplifier, and lengths of the first and second semiconductor optical amplifiers may be adjusted such that variations of gains and phases are the same in a region where the gains are not saturated, and only phase difference of $\pi$ is provided in a region where the gains are saturated.

The optical signal that transmits the first semiconductor optical amplifier may be changed by $\pi$ in phase by the phase control means.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
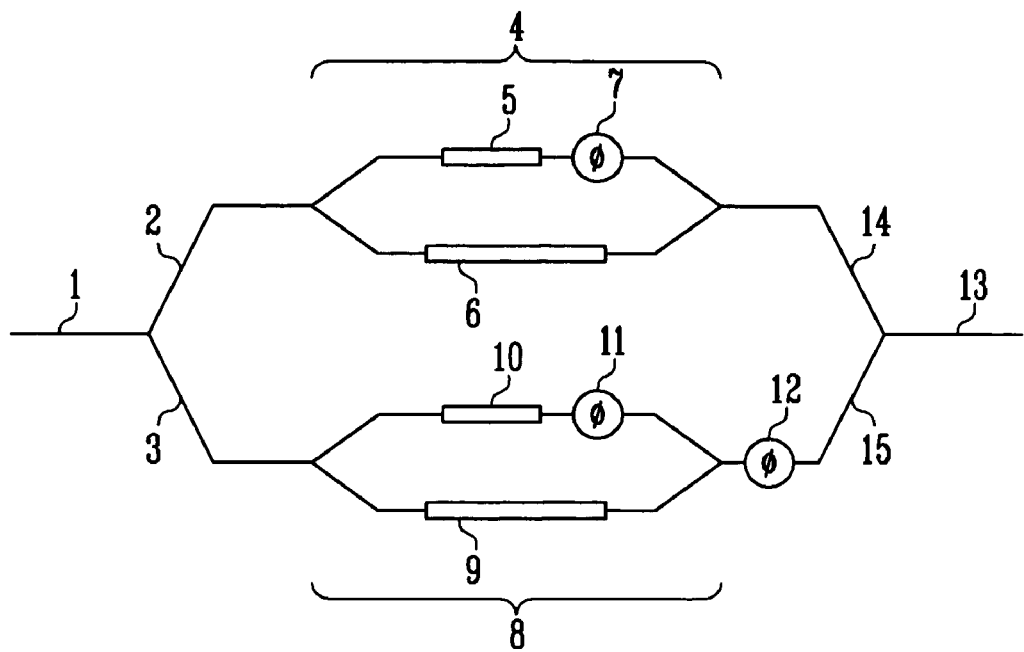
FIG. 1 is a schematic diagram of a signal processor for converting a signal according to the present invention.

FIG. 1 is a schematic diagram of a signal processor for converting a signal according to the present invention.

Waveguides 2 and 3 having different lengths are connected to an output stage of an input waveguide 1, respectively, and 2R regenerators 4 and 8 are connected to the waveguides 2 and 3, respectively. An output stage of the 2R regenerator 4 is connected to an output waveguide 13 through a waveguide 14, and an output stage of the 2R regenerator 8 is connected to the output waveguide 13 through a phase shifter 12 and a waveguide 15.

The waveguides 2 and 3 have the same structure, but the waveguide 2 is longer than the waveguide 3.

Each of the 2R regenerators 4 and 8 includes an asymmetric Mach-Zehnder interferometer in the same structure. For example, the 2R regenerator 4 has semiconductor optical amplifiers 5 and 6 having different lengths in the same structure, connected in parallel between the waveguide 2 and the waveguide 14, and phase control means 7 connected between the semiconductor optical amplifier 5 and the waveguide 14. In addition, the 2R regenerator 8 has semiconductor optical amplifiers 9 and 10 connected in parallel between the waveguide 3 and the phase shifter 12 and having different lengths in the same structure, and phase control means 11 connected between the semiconductor optical amplifier 10 and the phase shifter 12.

The semiconductor optical amplifiers 5 and 6, or 9 and 10 have the same structure, but the semiconductor optical amplifiers 5 and 10 are shorter than the semiconductor optical amplifiers 6 and 9.

Figure 2:
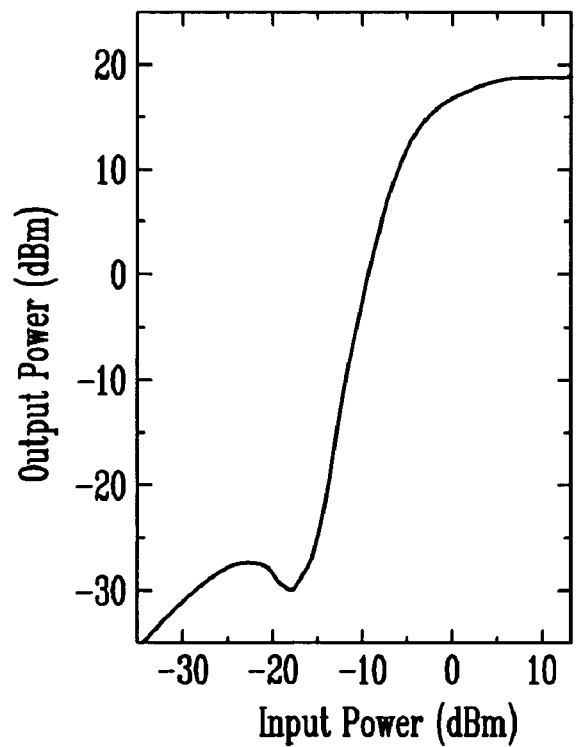
FIG. 2 is an optical transfer curve of a 2R regenerator adapted to the present invention.

FIG. 2 is an optical transfer curve of the 2R regenerators 4 and 8, showing step-like optical transfer characteristics. With the step-like optical transfer curve, the 2R regeneration effect can be obtained. To obtain the step-like optical transfer curve, variations of gains and phases between two semiconductor optical amplifiers 5 and 6, or 9 and 10 should be the same in a region where the gain is not saturated, and a phase difference of $\pi$ should be provided in a region where the gain is saturated. With adjustment of two variables, i.e., lengths and supply currents of the semiconductor optical amplifiers 5 and 6, or 9 and 10 and phase control means 7 and 11 the above two conditions can be sufficed.

Here, when a phase of the optical signal that transmits the semiconductor optical amplifiers 5 and 10 is changed by $\pi$ using the phase control means 7 and 11, a phase difference of $\pi$ is generated in a region where the gains are not saturated, i.e., the gains are the same, thus resulting in destructive interference, while in a region where the gains are saturated, constructive interference is generated. Under this condition, the optical transfer curve shown as FIG. 2 is obtained.

Intensity of an input power or output power (dBm) in FIG. 2 may linearly vary according to characteristics of a semiconductor optical amplifier, so that it is not limited to the number described in the present embodiment. In addition, while the asymmetric Mach-Zehnder interferometer with two semiconductor optical amplifiers having different lengths has been described, the present invention is not limited thereto, and the same effect can be obtained by other types of interferometers with which the 2R regeneration is performed.

Figure 3:
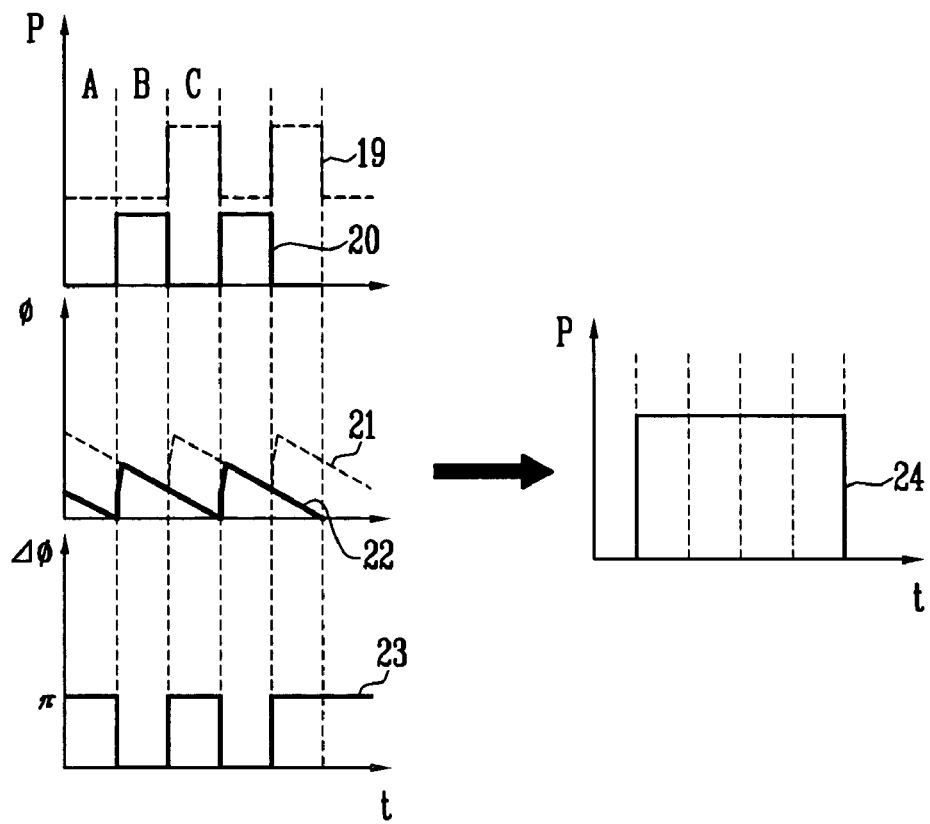
FIG. 3 is a waveform diagram for explaining operation of a signal processor for converting a signal according to the present invention.

When a time delay due to a length difference between the waveguides 2 and 14 and the waveguides 3 and 15 is adjusted to be a time corresponding to a half of one bit of the RZ signal, an optical signal 19 passing through the waveguide 2, the 2R regenerator 4 and the waveguide 14 is more delayed in time than an optical signal passing through the waveguide 3, the 2R regenerator 8 and the waveguide 15, as in a waveform of FIG. 3 indicating a time t and an optical power P.

Referring to FIG. 3, a region of a time slot A corresponds to a region where intensity of the input power in FIG. 2 is off, so that the signals 19 and 20 have a very small level of "0" in the region of the time slot A.

In a region of a time slot B, the signal 20 has a high intensity, i.e., a level of "1".

In a region of a time slot C, as shown in a waveform indicating a time t and a phase $\phi$, a phase is gradually decreased due to a carrier recovery time of the semiconductor optical amplifier. This phenomenon may generate interference with a phase of the subsequently following signals, leading to signal distortion. However, when a signal 22 is linearly moved using the phase shifter 12 such that a phase difference of $\pi$ between the signals 21 and 22 is provided in the region of the time slot C, constructive interference occurs in the region of the time slot C, so that signal distortion is not generated. Through this process, the NRZ signal 24 can be obtained as shown in FIG. 3, and this signal has a very large extinction ratio because it is processed essentially based on the optical transfer curve of the 2R regenerator.

Figure 4:
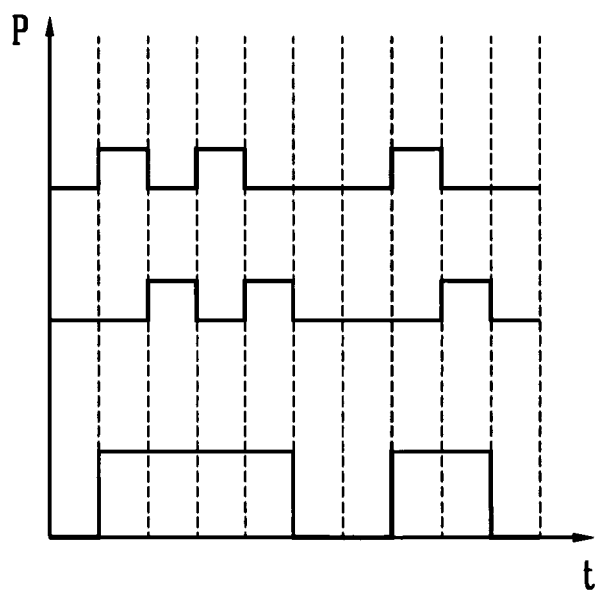
FIG. 4 is a waveform diagram showing an example in which an RZ signal is converted into an NRZ signal through a 2R regenerator.

FIG. 4 is a waveform diagram showing an example in which an RZ signal is converted into an NRZ signal through a 2R regenerator, according to the present invention.

When a signal is not optimized in an optical communication system, the overall system performance is degraded due to signal distortion. According to the present invention, two 2R regenerators between an input waveguide and an output waveguide converts an RZ signal into an NRZ signal using a signal processor connected in parallel through waveguides having different lengths. Therefore, by converting the RZ signal into the NRZ signal having a large extinction ratio, the optical communication system can be optimized and easily implemented.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A signal processor for converting a signal that converts a return to zero (RZ) signal into a non-return to zero (NRZ) signal, the signal processor comprising:

first and second waveguides respectively connected to an output stage of an input waveguide and having different lengths from each other;
   first and second 2R regenerators respectively connected to the first and second waveguides;
   a third waveguide connected between an output stage of the first 2R regenerator and an output waveguide;
   a phase shifter connected to an output stage of the second 2R regenerator; and
   a fourth waveguide connected between the phase shifter and the output waveguide.

2. The signal processor according to claim 1, wherein the first and third waveguides are longer than the second and fourth waveguides.

3. The signal processor according to claim 1, wherein the first and third waveguides and the second and fourth waveguides have a length difference causing a delay corresponding to a half of one bit of the RZ signal.

4. The signal processor according to claim 1, wherein the first 2R regenerator comprises:

first and second semiconductor optical amplifiers connected in parallel between the first and third waveguides and having different lengths from each other; and
   phase control means connected between the first semiconductor optical amplifier and the third waveguide.

5. The signal processor according to claim 4, wherein the first semiconductor optical amplifier is shorter than the second semiconductor optical amplifier.

6. The signal processor according to claim 4, wherein lengths of the first and second semiconductor optical amplifiers are adjusted such that variations of gains and phases are the same in a region in which the gains are not saturated and a phase difference of $\pi$ is provided in a region in which the gains are saturated.

7. The signal processor according to claim 4, wherein an optical signal that transmits the first semiconductor optical amplifier is changed by $\pi$ in phase by the phase control means.

8. The signal processor according to claim 1, wherein the second 2R regenerator comprises:

first and second semiconductor optical amplifiers connected in parallel between the second and fourth waveguides and having different lengths from each other; and
   phase control means connected between the first semiconductor optical amplifier and the fourth waveguide.

9. The signal processor according to claim 8, wherein the first semiconductor optical amplifier is shorter than the second semiconductor optical amplifier.

10. The signal processor according to claim 8, wherein lengths of the first and second semiconductor optical amplifiers are adjusted such that variations of gains and phases are the same in a region in which the gains are not saturated and a phase difference of $\pi$ is provided in a region in which the gains are saturated.

11. The signal processor according to claim 8, wherein an optical signal that transmits the first semiconductor optical amplifier is changed by $\pi$ in phase by the phase control means.

* * * * *